United States Patent
Wu et al.

(10) Patent No.: US 10,028,263 B2
(45) Date of Patent: Jul. 17, 2018

(54) METHOD AND DEVICE FOR SENDING AND RECEIVING DOWNLINK CONTROL INFORMATION

(75) Inventors: Xin Wu, Shenzhen (CN); Bo Dai, Shenzhen (CN); Zhisong Zuo, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 174 days.

(21) Appl. No.: 14/238,524

(22) PCT Filed: Mar. 23, 2012

(86) PCT No.: PCT/CN2012/072975
§ 371 (c)(1),
(2), (4) Date: Feb. 12, 2014

(87) PCT Pub. No.: WO2012/152142
PCT Pub. Date: Nov. 15, 2012

(65) Prior Publication Data
US 2014/0233537 A1    Aug. 21, 2014

(30) Foreign Application Priority Data
Aug. 12, 2011    (CN) .......................... 2011 1 0231603

(51) Int. Cl.
*H04W 72/04*    (2009.01)
*H04L 5/00*    (2006.01)

(52) U.S. Cl.
CPC ......... *H04W 72/042* (2013.01); *H04L 5/0053* (2013.01); *H04L 5/0091* (2013.01)

(58) Field of Classification Search
None
See application file for complete search history.

(56) References Cited

U.S. PATENT DOCUMENTS

2011/0069637 A1* 3/2011 Liu .................. H04L 5/0007
370/254
2011/0076962 A1* 3/2011 Chen .................. H04L 5/001
455/68

(Continued)

FOREIGN PATENT DOCUMENTS

| CA | 2765513 A1 | 12/2010 |
| CN | 101998526 A | 3/2011 |
| CN | 102355340 A | 2/2012 |

(Continued)

OTHER PUBLICATIONS

International Search Report for corresponding application PCT/CN2012/072975 filed Mar. 23, 2012; dated Jul. 5, 2012.

(Continued)

*Primary Examiner* — Christine Duong
(74) *Attorney, Agent, or Firm* — Cantor Colburn LLP

(57) ABSTRACT

Disclosed are a method and a device for sending and receiving downlink control information. The method comprises: discrete user-specific search space is determined, control channel resources corresponding to the discrete user-specific search spaces being distributed discretely; and the downlink control information on the discrete user-specific search space is sent. Through the disclosure, the diversity effect of sending physical downlink control information is improved.

18 Claims, 5 Drawing Sheets

(56) References Cited

U.S. PATENT DOCUMENTS

2011/0085513 A1   4/2011 Chen
2011/0110316 A1*  5/2011 Chen .................... H04L 5/0053
                                                  370/329

FOREIGN PATENT DOCUMENTS

CN      101860896      10/2013
WO      2009118704 A1  10/2009
WO      2010131925 A2  11/2010

OTHER PUBLICATIONS

European Search Report for corresponding application EP12782010; dated Dec. 16, 2014.

* cited by examiner

METHOD AND DEVICE FOR SENDING AND RECEIVING DOWNLINK CONTROL INFORMATION

TECHNICAL FIELD

The disclosure relates to the communication field, and in particular to a method and a device for sending and receiving downlink control information.

BACKGROUND

A radio frame in a Long Term Evolution (LTE) system comprises frame structures of a Frequency Division Duplex (FDD) mode and a Time Division Duplex (TDD) mode. FIG. 1 is a schematic diagram of a frame structure in an FDD mode according to the relevant art, as shown in FIG. 1, one radio frame of 10 ms is composed of 20 time slots, wherein the length of each time slot is 0.5 ms and the time slots are numbered from 0 to 19; the time slots 2i and 2i+1 compose a subframe i, the length of which is 1 ms. FIG. 2 is a schematic diagram of a frame structure in a TDD mode according to the relevant art, as shown in FIG. 2, one radio frame of 10 ms consists of two half frames, wherein the length of each half frame is 5 ms; one half frame comprises 5 subframes, wherein the length of each subframe is 1 ms; the subframe i is defined as two time slots 2i and 2i+1, wherein the length of each time slot is 0.5 ms. In the above-mentioned two frame structures, for a normal cyclic prefix (Normal CP), one time slot comprises 7 symbols, wherein the length of each symbol is 66.7 µs, wherein the CP length of the first symbol is 5.21 µs, and the lengths of the rest 6 symbols are 4.69 µs; for an extended cyclic prefix (Extended CP), one time slot comprises 6 symbols, wherein the CP lengths of all the symbols are 16.67 µs.

The release number of LTE corresponds to R8 (Release 8), the release number of the additional release thereof is R9 (Release 9); furthermore, as regards the further LTE-Advance, the release number thereof is R10 (Release 10). Three types of downlink physical control channels are defined in LTE as follows: a physical control format indicator channel (PCFICH), a physical hybrid automatic retransmission request indicator channel (PHICH), and a physical downlink control channel (PDCCH).

The information born by the PCFICH is used for indicating the number of orthogonal frequency division multiplexing (OFDM) symbols for transmitting the PDCCH in a subframe and is sent on the first OFDM symbol of the subframe, wherein the frequency location at which the information is located is determined by a system downlink bandwidth and a cell identify (ID).

The PHICH is used for bearing feedback information about positive acknowledgement/negative acknowledge (ACK/NACK) of uplink transmission data. The number of the PHICH and the position in time-frequency thereof can be determined by a system message and a cell ID in a physical broadcast channel (PBCH) of a downlink carrier where the PHICH is located.

The PDCCH is used for bearing downlink control information (DCI), comprising uplink and downlink scheduling information and uplink power control information. The DCI format is divided into the following types: DCI format 0, DCI format 1, DCI format 1A, DCI format 1B, DCI format 1C, DCI format 1D, DCI format 2, DCI format 2A, DCI format 3, DCI format 3A etc., wherein:

DCI format 0 is used for indicating the scheduling of a physical uplink shared channel (PUSCH);

DCI format 1, DCI format 1A, DCI format 1B, DCI format 1C and DCI format 1D are different modes used for scheduling a PDSCH codon;

DCI format 2, DCI format 2A and DCI format 2B are different modes used for space division multiplexing;

and DCI format 3 and DCI format 3A are different modes used for power control instructions of a physical uplink control channel (PUCCH) and the PUSCH.

A physical resource transmitted by the physical downlink control channel (PDCCH) takes a control channel element (CCE) as a unit, wherein the size of a CCE is 9 resource element groups (REG), i.e. 36 resource elements, and a PDCCH may occupy 1, 2, 4 or 8 CCE(s). As regards the sizes of these four types of PDCCHs occupying 1, 2, 4 or 8 CCE(s), a tree-based aggregation is used, i.e., the PDCCH occupying 1 CCE can start from any one of the CCE location; the PDCCH occupying 2 CCEs starts from the CCE location of an even number; the PDCCH occupying 4 CCEs starts from the CCE location of 4 integer multiple; and the PDCCH occupying 8 CCEs starts from the CCE location of 8 integer multiple.

Each aggregation level defines a search space, comprising a common search space and a user equipment (UE) specific search space. The number of CCEs of the whole search space is determined by the number of OFDM symbols and the number of the groups of the PHICH which are occupied by a control area instructed by the PCFICH in each downlink subframe. The UE performs blind detection on all possible PDCCH code rates in the search space according to the DCI format corresponding to the transmission mode.

In the kth subframe, a control domain bearing the PDCCH is composed a group of CCE, of which the number is $N_{CCE, K}$ numbered from 0 to $N_{CCE, K}-1$ The UE should detect a group of PDCCH candidates in each non-DRX (non-Discontinuous Reception) subframe so as to obtain control information, and the detection refers to decoding the PDCCH in the group according to all the DCI formats to be detected. The PDCCH candidates required to be detected are defined in a manner of search space, as regards the aggregation level L□{1, 2, 4, 8}, the search space $S_k^{(L)}$ is defined by a group of PDCCH candidates. In the search space $S_k^{(L)}$ the CCE corresponding to the PDCCH candidate m is defined by the following formula:

$$L \cdot \{(Y_k + m') \bmod \lfloor N_{CCE,k}/L \rfloor\} + i,$$

Wherein, as regards the user-specific search space, under the sense that the UE configures a carrier instruction domain, $m'=m+M^{(L)} \cdot n_{CI}$, wherein $n_{CI}$ is the carrier indication domain value; and under the sense that the UE does not configure a carrier instruction domain, m'=m, wherein m=0, . . . , $M^{(L)}-1$. $M^{(L)}$ is the number of PDCCH candidates to be detected in the search space $S_k^{(L)}$, i=0, . . . , L−1.

As regards the common search space, $Y_k=0$, L takes 4 and 8.

As regards the UE-Specific search space, L takes 1, 2, 4 and 8.

$$Y_k = (A \cdot Y_{k-1}) \bmod D,$$

wherein $Y_{-1} = n_{RNTI} \neq 0$, A=39827, D=65537, k=$\lfloor n_s/2 \rfloor$, $n_s$ is a timeslot number in a radio frame. $n_{RNTI}$ is a corresponding RNTI (Radio Network Temporary Identifier).

The UE should detect two common search spaces of which the aggregation levels are 4 and 8 respectively, and four UE-specific search spaces of which the aggregation levels are 1, 2, 4 and 8 respectively, and the common search space can be overlapped with the UE-specific search space.

Particular detection time(s) and corresponding search space are as shown in Table 1:

TABLE 1

Corresponding relation table between detection times and corresponding search space

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The UE, through high-layer signalling, is semi-statically configured to receive PDSCH data transmission according to the instruction of the PDCCH of the UE-Specific search space based on one of the followings transmission modes:

Mode I: Single antenna port; and port 0
Mode II: Transmit diversity
Mode III: Open-loop spatial multiplexing
Mode IV: Closed-loop spatial multiplexing
Mode V: Multi-user multiple input multiple output (Multi-user MIMO)
Mode VI: Closed-loop Rank=1 precoding
Mode VII: Single antenna port; and port 5

If the UE is configured by a high-layer to use a cyclic redundancy check (CRC) which is scrambled by a cell radio network temporary identifier (C-RNTI) to decode the PDCCH, then the UE should decode the PDCCH and all relevant PDSCHs according to corresponding combinations defined in table 2:

TABLE 2

Corresponding relation table of downlink transmission mode, DCI format, search space and PDSCH

| UE downlink transmission mode | DCI format | Search space | PDSCH transmission plan corresponding to PDCCH |
|---|---|---|---|
| Mode I | DCI format 1A | Common and C-RNTI defined UE specific | single antenna port, and port 0 |
| | DCI format 1 | C-RNTI defined UE specific | Single antenna port, and port 0 |
| Mode II | DCI format 1A | Common and C-RNTI defined UE specific | Transmission diversity |
| | DCI format 1 | C-RNTI defined UE specific | Transmission diversity |
| Mode III | DCI format 1A | Common and C-RNTI defined UE specific | Transmission diversity |
| | DCI format 2A | C-RNTI defined UE specific | Open-loop spatial multiplexing or transmission diversity |
| Mode IV | DCI format 1A | Common and C-RNTI defined UE specific | Transmission diversity |
| | DCI format 2 | C-RNTI defined UE specific | Closed-loop spatial multiplexing or transmission diversity |
| Mode V | DCI format 1A | Common and C-RNTI defined specific | Transmission diversity |
| | DCI format 1A | C-RNTI UE defined UE specific | Multiuser multiple input multiple output |
| Mode VI | DCI format 1A | Common and C-RNTI defined UE specific | Transmission diversity |
| | DCI format 1B | C-RNTI defined UE specific | Closed-loop Rank = 1 precoding |
| Mode VII | DCI format 1A | Common and C-RNTI defined UE specific | if the number of the antenna ports of the PBCH is 1, using single antenna port, and port 0, otherwise, using transmit diversity |
| | DCI format 1 | C-RNTI defined UE specific | single antenna port; and port 5 |
| Mode VIII | DCI format 1A | Common and C-RNTI defined UE specific | if the number of the antenna ports of the PBCH is 1, using single antenna port, and port 0, otherwise, using transmit diversity |
| | DCI format 2B | C-RNTI defined UE specific | Dual-layer transmission, and port 7 and 8; or single antenna port, and port 7 and 8 |

TABLE 2-continued

Corresponding relation table of downlink transmission mode, DCI format,
search space and PDSCH

| UE downlink transmission mode | DCI format | Search space | PDSCH transmission plan corresponding to PDCCH |
|---|---|---|---|
| Mode ☐ | DCI format 1A | Common and C-RNTI defined UE specific | if the number of the antenna ports of the PBCH is 1, using single antenna port, and port 0, otherwise, using transmit diversity |
|  | DCI format 2C | C-RNTI defined UE specific | Up to 8 layer transmission, and port 7-14 |

Since an LTE-Advanced network requires to be able to access an LTE user, an operation frequency band thereof requires to cover the current LTE frequency band, there is no distributable spectral bandwidth of continuous 100 MHz on this frequency band, a direct technique required to be solved for the LTE-Advanced is using the carrier aggregation technique to aggregate several continuous component carrier frequencies (frequency spectrum) distributed at different frequency bands so as to form a 100 MHz bandwidth which is able to be used by the LTE-Advanced. That is to say, the aggregated frequency spectrum is divided into n component carrier frequencies (frequency spectrum), the frequency spectrum in each component carrier frequency (frequency spectrum) being continuous.

In the further release Release 11 of the LTE-Advanced, since the requirements of the user for accessing increase, the original physical downlink control channel PDCCH resource is not to sufficiently meet the requirements of the new release, FIG. 3 is the schematic diagram illustrating configurations of PDCCH and PDSCH in a subframe in the relevant art, as shown in FIG. 3, it is possible that the limit of the number of the PDCCH symbols will be unable to meet the effect brought by the increase of the users. Meanwhile, under the scene of heterogeneous networks, since different types of eNodeBs have relatively strong interference, the problem of macro eNodeB interfering with micro eNodeB (Pico) and the problem of home eNodeB interfering with macro eNodeB require to be well solved. Then developing a new PDCCH resource is to be an effective solution for solving the above-mentioned problems. FIG. 4 is a contrast schematic diagram of time-frequency locations of the PDCCH in the relevant art and the possible time-frequency locations of the new PDCCH, the new PDCCH can be mapped on 2 time slots of the subframe, or, the new PDCCH is only mapped on part of continuous OFDM symbols, as shown in FIG. 4, the legacy (existing) PDCCH and the new PDCCH exist on a resource block in parallel.

However, it only specifies in relevant art that the method for sending the legacy PDCCH is, for each aggregation level, sending downlink control information on continuous control channel elements, but the manner is relatively single, especially, the new PDCCH takes a physical resource block as a channel element, if the new PDCCH is only mapped on the continuous physical resource blocks, then the new PDCCH would be unable to obtain the diversity gain, and for the UE at the edge of a cell having a relatively poor channel condition, a stable transmission performance is not able to be obtained.

As regards the relatively single manner for sending the physical downlink control information in relevant art, no effective solution has been proposed so far.

SUMMARY

The disclosure provides a method and a device for sending and receiving downlink control information so as to at least solve the problem of the relatively single manner for sending physical downlink control information in relevant art.

To achieve the above-mentioned objective, according to one aspect of the disclosure, a method for sending downlink control information is provided.

The method for sending downlink control information according to the disclosure, which is applied to an eNodeB, comprises determining discrete user-specific search space, wherein control channel resources corresponding to the discrete user-specific search space are distributed discretely; and sending the downlink control information on the discrete user-specific search space.

Preferably, the determining the discrete user-specific search space comprises in each time domain resource unit, on the control channel resources performing a discrete operation with a predefined interval the unit of which is the unit of control channel resource; and determining control channel resources obtained by the discrete operation to be the discrete user-specific search space.

Preferably, the predefined interval is determined by at least one of the following: high-level signalling configuration, a fixed value set by a system; an aggregation level, the number of control channel resource units of the UE-specific search space and the number of the physical downlink control channel candidates; and a signalling notification in the downlink control information of the legacy downlink control channel, wherein the legacy downlink control channel is a downlink control channel of a control channel area on the same subframe or other subframe.

Preferably, the control channel resource comprises one of the following: a virtual resource block, a physical resource block and a control channel element.

Preferably, the above-mentioned method further comprises: the eNodeB sends to the user equipment (UE) a configuration of the control channel resource where the discrete user-specific search space is located for the UE to detect the downlink control channel, wherein the configuration of the control channel resources comprises that configurations at positions of the frequency domain, which are corresponding to position of each time domain unit, of the downlink control channel are the same, or the position in the frequency domain of the downlink control channel changes with the position of the time domain unit.

Preferably, the time domain unit comprises one of the following: a subframe, a time slot, a plurality of subframes and a plurality of time slots.

Preferably, the position of the frequency domain position is determined by at least one of the following: downlink bandwidth; a notification of the high-layer signalling; a high-layer signalling and the predefined interval; and a signalling notification in the downlink control information of the legacy downlink control channel.

Preferably, determining the position of the frequency domain by the signalling notification in the downlink control information of the legacy downlink control channel comprises that the position of the frequency domain is determined by taking a resource block group as the unit.

To achieve the above-mentioned objective, according to one aspect of the disclosure, a method for receiving downlink control information is further provided.

The method for receiving the downlink control information according to the disclosure, which is applied to the UE, comprises determining discrete user-specific search space, wherein control channel resources corresponding to the discrete user-specific search space are distributed discretely; and detecting the downlink control information on the discrete user-specific search space.

Preferably, determining the discrete user-specific search space comprises in each time domain resource unit, on the control channel resources performing a discrete operation with a predefined interval the unit of which is the unit of control channel resource; and determining the control channel resources obtained by the discrete operation to be the discrete user-specific search space.

Preferably, the above-mentioned method further comprises: receiving a configuration, which is sent by the eNodeB and is for detecting the downlink control channel, of the control channel resources where the discrete user-specific search space is located, wherein the configuration of the control channel resources comprises that configurations at positions of the frequency domain, which are corresponding to position of each time domain unit, of the downlink control channel are the same, or the position of frequency domain of the downlink control channel changes with the position of the time domain unit.

In order to achieve the above-mentioned objective, according to another aspect of the disclosure, a device for sending downlink control information is provided.

The device for sending downlink control information according to the disclosure, which is applied to the eNodeB, comprises a first determination module configured to determine discrete user-specific search space, wherein control channel resources corresponding to the discrete user-specific search space are distributed discretely; and a first sending module configured to send the downlink control information on the discrete user-specific search space.

Preferably, the first determination module comprises a first discrete module configured to, in each time domain resource unit, perform a discrete operation on the control channel resources with a predefined interval the unit of which is the unit of control channel resource; and a second determination module configured to determine control channel resources obtained by the discrete operation to be the discrete user-specific search space, Preferably, the above-mentioned device further comprises a second sending module configured to send to user equipment (UE) a configuration, which is for the UE to detect the downlink control channel, of a control channel resource where the discrete user-specific search space is located, wherein the configuration of the control channel resources comprises that configurations at positions of the frequency domain, which are corresponding to position of each time domain unit, of the downlink control channel are the same, or the position of the frequency domain of the downlink control channel changes with the position of the time domain unit.

In order to achieve the above-mentioned objective, according to another aspect of the disclosure, a device for receiving downlink control information is further provided.

The device for receiving downlink control information according to the disclosure, which is applied to an UE, comprises a third determination module configured to determine discrete user-specific search space, wherein control channel resources corresponding to the discrete user-specific search space are distributed discretely; and a detection module configured to detect the downlink control information on the discrete user-specific search space.

Preferably, the third determination module comprises a second discrete module configured to, in each time domain resource unit, perform a discrete operation on the control channel resources using a predefined interval the unit of which is the unit of control channel resource; and a fourth determination module configured to determine control channel resources obtained by the discrete operation to be the discrete user-specific search space.

Preferably, the above-mentioned device further comprises a receiving module configured to receive a configuration, which is sent by the eNodeB and is for detecting the downlink control channel, of the control channel resources where the discrete user-specific search space is located, wherein the configuration of the control channel resources comprises that configurations at positions of the frequency domain, which is corresponding to position of each time domain unit, of the downlink control channel are the same, or the position of frequency domain of the downlink control channel changes with the position of the time domain unit.

Through the present application, discrete user-specific search space is determined, wherein control channel resources corresponding to the discrete user-specific search space are distributed discretely; and the downlink control information is sent on the discrete user-specific search space, thereby solving the problem that no effective solution has been proposed so far for the relatively single manner for sending the physical downlink control information in relevant art, and further achieving the effect of improving the diversity effect of sending physical downlink control information.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

The embodiments are described in conjunction with the drawings as follows. It shall be understood that the embodiments of the present application and the features of the embodiments can be combined with each other if there is no conflict.

Figure 1:
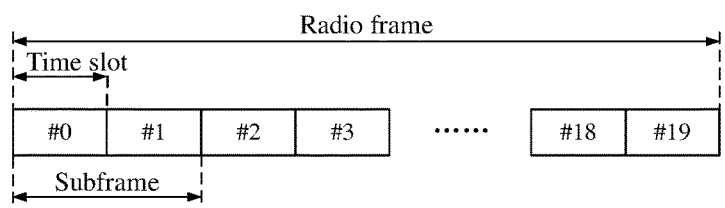
FIG. 1 is a schematic diagram of a frame structure in an FDD mode according to the relevant art.
Figure 2:
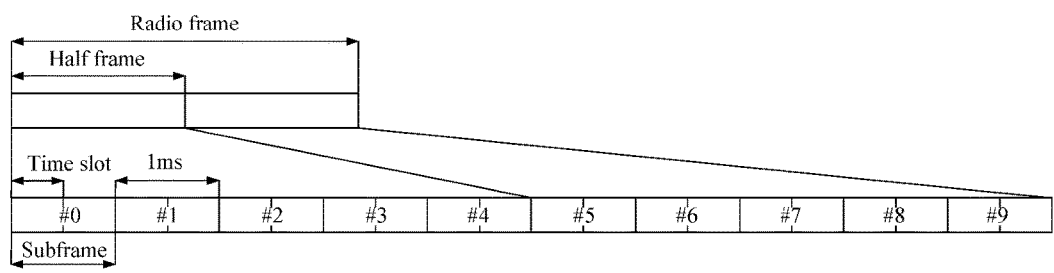
FIG. 2 is a schematic diagram of a frame structure in a TDD mode according to relevant art.
Figure 3:
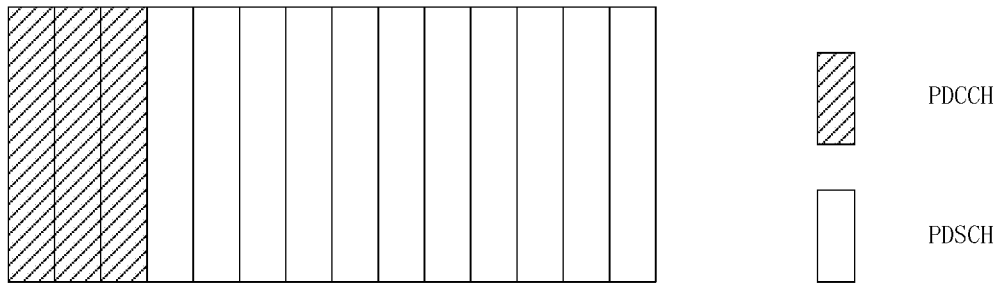
FIG. 3 is a schematic diagram illustrating configurations of PDCCH and PDSCH in a subframe in the relevant art.
Figure 4:
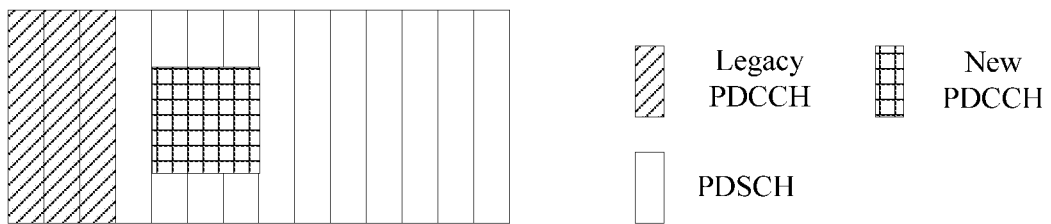
FIG. 4 is a contrast schematic diagram of time-frequency locations of the PDCCH in the prior art and the possible time-frequency locations of the new PDCCH.
Figure 5:
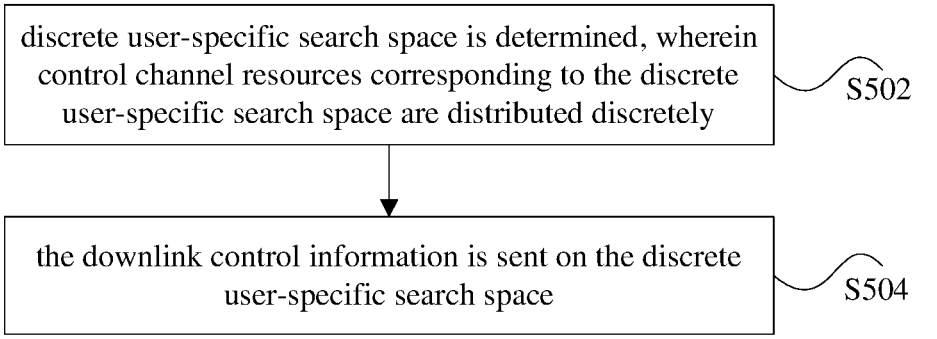
FIG. 5 is a flowchart of a method for sending downlink control information according to an embodiment of the disclosure.

The present embodiment provides a method for sending downlink control information, which is applied to an eNodeB, FIG. 5 is the flowchart of the method for sending downlink control information according to an embodiment of the disclosure, as shown in FIG. 5, and the method comprises steps S502 and S504 as follows.

Step S502: discrete user-specific search space is determined, wherein control channel resources corresponding to the discrete user-specific search space are distributed discretely.

Step S504: the downlink control information is sent on the discrete user-specific search space.

Through the above-mentioned steps, the downlink control information is achieved to be sent on the discrete user-specific search space, and the problem of relatively single manner for sending the physical downlink control information caused by only adopting a continuous manner in relevant art is overcome, thereby improving the diversity of sending the physical downlink control information. The frequency diversity gain and the scheduling gain are acquired.

The above-mentioned dispersing can refer to mapping the downlink control information on the discrete control channel resources, also can refer to that the above-mentioned search space is composed of discrete control channel resource groups, wherein each control channel resource group is composed of continuous control channel resources; the above-mentioned physical downlink control information is sent on the new resource, and the channel bearing the physical downlink control information can be called as an enhanced physical downlink control channel.

In implementation, the following method can be adopted to determine the discrete user-specific search space: in each time domain resource unit, on the control channel resources a discrete operation is performed with a predefined interval the unit of which is the unit of control channel resource; and control channel resources obtained by the discrete operation is determined to be the discrete user-specific search space.

In this method, on the control channel resources the dispersing is performed with a predefined interval the unit of which is the unit of control channel resource, i.e., the dispersing is performed on time frequency resources.

Preferably, the predefined interval in this manner can be determined by at least one of the following: high-level signalling configuration, a fixed value set by a system; an aggregation level, the number of units of the control channel resource of the user-specific search space and the number of physical downlink control channel candidates; and a signalling notification in the downlink control information of the legacy downlink control channel, wherein the legacy downlink control channel is a downlink control channel of a control channel area on the same subframe or other subframes.

The above-mentioned signalling in the information of the legacy downlink control channel can determine the position in the predefined frequency domain resource through a resource representation manner of taking a resource block group as a unit.

The resource block group is composed of discrete resource blocks;

In a preferred embodiment, the eNodeB sends to the user equipment (UE) a configuration, which is for the UE to detect the downlink control channel, of the control channel resources where the discrete user-specific search space is located, wherein the configuration of the control channel resource comprises configuration at position in the frequency domain, which is corresponding to position in each time domain unit, of the downlink control channel is the same, or the position of the frequency domain of the downlink control channel changes with the position of the time domain unit.

Preferably, the time domain unit refers to a subframe, a time slot, a plurality of subframes or a plurality of time slots. The number of the corresponding frequency domain resources can be set flexibly by arranging multiple types of time domain units.

Preferably, the position in the frequency domain is determined by at least one of the following: the downlink bandwidth; a notification of the high layer signalling; a high layer signalling and the predefined interval; and a signalling notification in the downlink control information of the legacy downlink control channel. Taking the downlink bandwidth as example: if the downlink bandwidth is 5 MHZ, then the predetermined frequency domain resource is determined to be 1-10; if the downlink bandwidth is 10 MHz, then the predetermined frequency domain resource is determined to be 11-25; the position of the frequency domain is determined by the notification of the high layer signalling, i.e., in a range enabled by the high-level signalling, the predefined frequency domain resources of all the users corresponding to each time domain unit are the same; the position of the frequency domain is determined by the high-level signalling, the predefined interval and the subframe index, i.e., in a range enabled by the high-level signalling, the predefined frequency domain resources corresponding to each time domain unit change with the time domain unit (the subframe index), for example: the high-level signalling is configured to be the 5-10th control channel resources, and the predefined interval is 5, then, the predefined frequency domain resource corresponding to the first time domain unit is 5-10, the predefined frequency domain resource corresponding to the second time domain unit is 10-15, and so forth; and it is also can be notified by the signalling in the information of the legacy downlink control channel, for example, adding new information to a legacy downlink control information format to indicate the positions of the predefined frequency domain resources.

The above-mentioned signalling in the information of the legacy downlink control channel can determine the positions of the predefined frequency domain resources through a resource representation manner by taking the resource block group as a unit, wherein the resource block group comprises continuous resource blocks and/or discrete resource blocks.

Preferably, the control channel resource comprises one of the following: a virtual resource block, a physical resource block and a control channel element.

Figure 6:
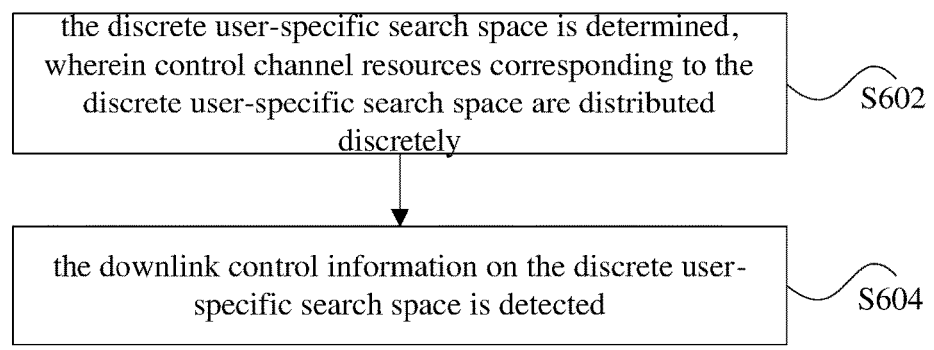
FIG. 6 is a flowchart of a method for receiving downlink control information according to an embodiment of the disclosure.

The present embodiment provides a method for receiving downlink control information, which is applied to an UE. FIG. 6 is a flowchart of the method for receiving the downlink control information according to an embodiment of the disclosure, as shown in FIG. 6, the method comprises the steps S602 to S604 as follows.

Step S602: the discrete user-specific search space is determined, wherein control channel resources corresponding to the discrete user-specific search space are distributed discretely.

Step S604: the downlink control information on the discrete user-specific search space is detected.

Through the above-mentioned steps, the downlink control information is achieved to be sent on the discrete user-specific search space, and the problem of relatively single manner for sending the physical downlink control information caused by only adopting a continuous manner in relevant art is overcome, thereby improving the diversity of sending the physical downlink control information.

In implementation, the following manner can be adopted to determine the discrete user-specific search space.

In each time domain resource unit, on the control channel resources a discrete operation is performed with a predefined interval the unit of which is the unit of control channel resource; and control channel resources obtained by the discrete operation is determined to be the discrete user-specific search space.

In a preferred implementation, the configuration, which is sent by the eNodeB and is for detecting the downlink control channel, of the control channel resources where the discrete user-specific search space is located is received, wherein the configuration of the control channel resources comprises that configurations at positions of the frequency domain, which are corresponding to position of each time domain unit, of the downlink control channel are the same, or the positions of frequency domain of the downlink control channel change with the positions of the time domain unit.

In another embodiment, the software for sending downlink control information is provided, and the software is used for executing the technical solutions described in the above-mentioned embodiment and the preferred embodiment.

In another embodiment, a storage medium is also provided, the above-mentioned software for sending the downlink control information is stored in the storage medium, and the storage medium includes, but is not limited to an optical disk, a floppy disk, a hard disk, an erasable memory and the like.

The embodiment of the disclosure also provides a device for sending downlink control information, the device for sending downlink control information can be used to realize the above-mentioned method for sending the downlink control information and the preferred implementation, what has been described will not be described again, and modules involved in the device for sending the downlink control information are described below. As used as follows, the term "module" can realize the combination of software and/or hardware with predefined functions. Although a system and a method described in the following embodiments are preferably achieved by the software, it is also possible and is conceived to realize through the hardware or the combination of the software and the hardware.

Figure 7:
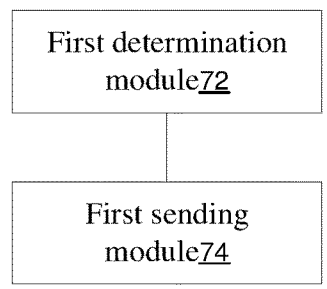
FIG. 7 is a block diagram showing a device for sending downlink control information according to an embodiment of the disclosure.

FIG. 7 is a block diagram showing the device for sending downlink control information according to an embodiment of the disclosure; the device can be applied to the eNodeB, as shown in FIG. 7, the device comprises a first determination module 72 and a first sending module 74.

The first determination module 72 is configured to determine the discrete user-specific search space, wherein control channel resources corresponding to the discrete user-specific search space are distributed discretely; and the first sending module 74 is connected to the first determination module 72 and is configured to send the downlink control information on the discrete user-specific search space determined by the first determination module 72.

Figure 8:
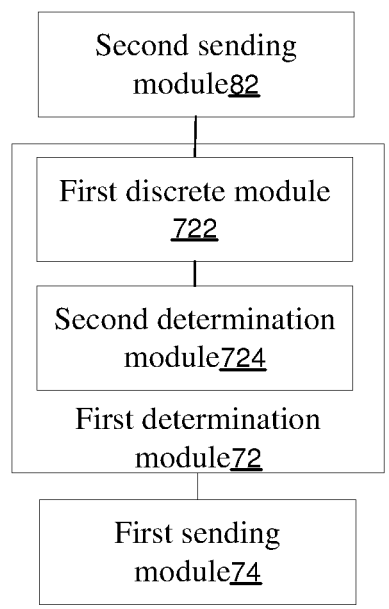
FIG. 8 is a preferred block diagram showing a device for sending downlink control information according to an embodiment of the disclosure.

FIG. 8 is a preferred block diagram showing the device for sending downlink control information according to an embodiment of the disclosure, as shown in FIG. 8, the first determination module 72 comprises a first discrete module 722 and a second determination module 724, the above-mentioned structure will be described below in detail.

The first discrete module 722 is configured to, in each time domain resource unit, perform a discrete operation on the control channel resources using a predefined interval the unit of which is the unit of control channel resource; and the second determination module 724 is connected to the first discrete module 722 and is configured to determine control channel resources obtained by the discrete operation of the second discrete module to be the discrete user-specific search space determined by the first determination module 722.

The device further comprises a second sending module 82 which is configured to send to UE a configuration, which is for the UE to detect the downlink control channel, of the control channel resources where the discrete user-specific search space is located, wherein the configuration of the control channel resources comprises that configurations at positions of the frequency domain, which are corresponding to position of each time domain unit, of the downlink control channel are the same, or the position of the frequency domain of the downlink control channel changes with the position of the time domain unit.

In another embodiment, software for receiving downlink control information is also provided, and the software is used for executing the technical solutions described in the above-mentioned embodiment and the preferred embodiment.

In another embodiment, a storage medium is also provided, the above-mentioned software for receiving the downlink control information is stored in the storage medium, and the storage medium includes, but is not limited to an optical disk, a floppy disk, a hard disk, an erasable memory and the like.

The embodiment of the disclosure also provides a device for receiving downlink control information, the device for receiving the downlink control information can be used to realize the above-mentioned method for receiving the downlink control information and the preferred implementation, what has been described will not be described again, and modules involved in the device for receiving the downlink control information are described below. As used as follows, the term "module" can realize the combination of software and/or hardware with predefined functions. Although a system and a method described in the following embodiments are preferably achieved by the software, it is also possible and can be conceived to realize through the hardware or the combination of the software and the hardware.

Figure 9:
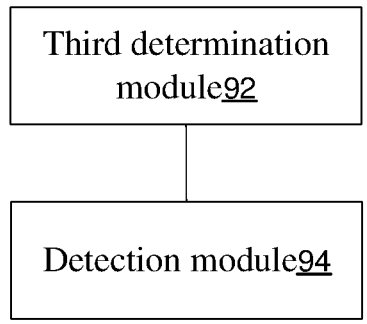
FIG. 9 is a block diagram showing a device for receiving downlink control information according to an embodiment of the disclosure.

FIG. 9 is a block diagram showing a device for receiving downlink control information according to an embodiment of the disclosure, the receiving device can be applied to the UE, as shown in FIG. 9, the device comprises a third determination module 92 and a detection module 94, and the above-mentioned structure is described below in detail.

The third determination module 92 is configured to determine discrete user-specific search space, wherein control channel resources corresponding to the discrete user-specific search space are distributed discretely; the detection module 94 is connected to the third determination module 92 and is configured to detect the downlink control information on the discrete user-specific search space determined by the third determination module 92.

Figure 10:
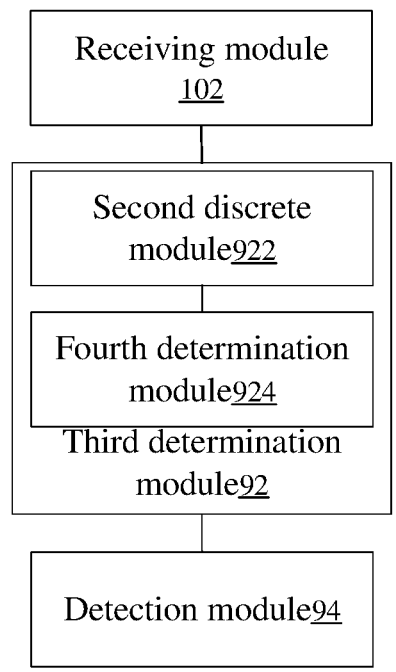
FIG. 10 is a preferred block diagram showing a device for receiving downlink control information according to an embodiment of the disclosure.

FIG. 10 is a preferred block diagram showing the device for receiving downlink control information according to an embodiment of the disclosure, as shown in FIG. 10, the third determination module 92 comprises a second discrete module 922, a fourth determination module 924 and a receiving module 102, and the above-mentioned structure is described below in detail.

The third determination module 92 comprises the second discrete module 922 which is configured to in each time domain resource unit, perform a discrete operation on the control channel resources using a predefined interval the unit of which is the unit of control channel resource; and the fourth determination module 924 which is connected to the second discrete module 922 and is configured to determine control channel resources obtained by the discrete operation of the second discrete module 922 to be the discrete user-specific search space.

the device further comprises a receiving module 102 which is connected to the second discrete module 922 and is configured to receive configuration, which is sent by the eNodeB and is for detecting the downlink control channel, of the control channel resources where the discrete user-specific search space is located, wherein the configuration of the control channel resources comprises that configurations at positions of the frequency domain, which are corresponding to position of each time domain unit, of the downlink control channel are the same, or the position of frequency domain of the downlink control channel changes with the position of the time domain unit.

The preferred embodiments are combined for description below, the following preferred embodiments is combined with the above-mentioned embodiments and the preferred implementations.

Preferred Embodiment I

The present embodiment provides a method for designing search space of a downlink control channel, the present embodiment can be applied in an LTE-Advanced system, and the method of the present embodiment comprises the following steps:

Step S1102: the eNodeB sends downlink control information to the UE on the discrete user-specific search space.

Step S1104: the UE detects the downlink control information sent by the eNodeB on the discrete user-specific search space.

Preferably, the user-specific search space at position in the time domain can be defined according to one or more of the following methods: UE detects the downlink control information on the discrete control channel resource unit according to the predefined aggregation level, wherein the control channel resource unit is dispersed in a manner of predefining an interval. The control channel resource unit is a virtual resource block, a physical resource block or a control channel element.

Preferably, configurations, which are for the UE to detect the downlink control channel, at positions in the frequency domain, which are corresponding to position of each time domain unit, are the same, or the position of the frequency domain for the UE to detect the downlink control channel changes with the position of the time domain unit. The time domain unit refers to a subframe, a time slot, a plurality of subframes or a plurality of time slots.

Preferably, at position in each time domain unit, the position in the frequency domain for the UE to detect the downlink control channel is defined according to one or more of the following methods: the bandwidth of the downlink; the notification of the high layer signalling; the high layer signalling and the predefined interval; and a signalling notification in the downlink control information of the legacy downlink control channel.

According to the method of in the present embodiment, by transmitting the downlink control information on the discrete user-specific search space, the transmission of the downlink control information can be added in the system so as to solve the problems such as increased number of users, serious interference.

Preferred Embodiment II

The present embodiment provides a method for designing search space of a downlink physical control channel, the present embodiment can be applied in an LTE-Advanced system, and the method of the present embodiment comprises the following steps:

Step S1202: the eNodeB sends to the UE downlink control information on the discrete user-specific search space.

Step S1204: the UE detects the downlink control information sent by the UE on the discrete user-specific search space.

The user-specific search space at position in the time domain unit in the present embodiment can be defined according to one or more of the following methods: the UE detects the downlink control information on the discrete control channel resource units according to the predefined aggregation level, wherein the control channel resource units are dispersed in a manner of predefining an interval. The control channel resource unit is a virtual resource block, a physical resource block or a control channel element.

Preferably, the number of the control channel resource units of the user-specific search space at position in the time domain unit is N.

Preferably, the UE detects the downlink control information on the discrete control channel resource units according to the predefined aggregation level, wherein the control channel resource units are dispersed in a manner of predefining an interval, and the specific methods are:

when the UE detects PDCCH according to a certain aggregation level, the number of the corresponding PDCCH candidates is M, then the position of the nth PDCCH candidate is increased by offset resource units with respect to the (n−1)th PDCCH candidate, wherein the offset is defined as follows: the offset is configured by the high-layer signalling; the offset is a fixed value; the offset is computed by the aggregation level, the number of the control channel resource units of the user-specific search space, and the number of the PDCCH candidates; and the offset is notified by the signalling in the downlink control information of the legacy downlink control channel, the legacy downlink control channel being the downlink control channel of a control channel area on the same subframe or other subframes;

preferably, configurations, which are for the UE to detect the downlink control channel, at positions in the frequency domain, which are corresponding to position of each time domain unit, are the same, or the positions in the frequency domain for the UE to detect the downlink control channel change with the positions of the time domain unit. The time domain unit refers to a subframe, a time slot, a plurality of subframes or a plurality of time slots.

Preferably, at position of each time domain unit, position in the frequency domain for the UE to detect the downlink control channel can be defined according to one or more of the following methods: the position in the frequency domain is determined by the downlink bandwidth; the position in the frequency domain is notified by the high layer signalling; the position in the frequency domain is determined by the high layer signalling and the predefined interval; and the position in the frequency domain is notified by the signalling in the downlink control information of the legacy downlink control channel.

Preferred Embodiment III

The present embodiment provides a method for designing search space of a downlink physical control channel, the present embodiment can be applied in an LTE-Advanced system, and the method of the present embodiment comprises the following steps:

Step S1302: the eNodeB sends to the UE downlink control information on the discrete user-specific search space.

Step S1304: the UE detects the downlink control information sent by the UE on the discrete user-specific search space.

Preferably, the downlink control information in the present embodiment is downlink control information on newly created PDCCH.

It should be noted that configurations, which is for the UE to detect the downlink control channel, at positions in the frequency domain, which are corresponding to position in each time domain unit, are the same, or the position in the frequency domain for the UE to detect the downlink control channel changes with the position of the time domain unit. The time domain unit refers to a subframe, a timeslot, a plurality of subframes or a plurality of time slots.

Preferably, the range of all users' specific search space at position of each time domain unit can be defined according to one or more of the following methods:

Manner I: it is determined by the downlink bandwidth.

If it is determined by the downlink bandwidth, then the downlink bandwidth can determine the range of all users' specific search space;

Manner II: it is notified by the high-layer signalling.

If it is notified by the high-layer signalling, then in a range enabled by this high-layer signalling, the configurations of the range of all users' specific search space at position of each time domain unit are the same.

Manner III: it is determined by the high-level signalling, the predefined interval and the sub frame index.

If it is determined by the high-level signalling, the predefined interval and the subframe index, then in a range enabled by the high-level signalling, the range of all users' specific search spaces at position of each time domain unit change with the index of the time domain unit. For example: the high-level signalling is configured to be the 5th-10th control channel resources, and the predefined interval is 5, then, the range of the user-specific search space on the first time domain unit is the 5th-10th, the range of the user-specific search space on the second time domain unit is the 10th-15th, and so forth.

Manner IV: it is notified by the signalling in the information of the legacy downlink control channel, the legacy downlink control channel being the downlink control channel of a control channel area on the same subframe or other subframes.

If there is a signalling in the original downlink control channel information to notify, then new information is to be added to the downlink control channel information format to show the range of this specific search space. For example, using $N_{RBG}=\lceil N_{RB}^{DL}/P \rceil$ bit information to show the range of the specific search space, where $N_{RB}^{DL}$ is the downlink bandwidth, and p can be determined according to table 3:

TABLE 3

Corresponding relation between system bandwidth and RBG size

| System Bandwidth $N_{RB}^{DL}$ | RBG Size (P) |
| --- | --- |
| ≤10 | 1 |
| 11-26 | 2 |
| 27-63 | 3 |
| 64-110 | 4 |

In this manner, the definition of the UE-specific search space can be represented by the following formula:

$$L \cdot \left\{ \left( Y_k + m' \cdot \left\lfloor \frac{N_k}{M^{(L)} \cdot L} \right\rfloor \right) \mod \left\lfloor \frac{N_k}{L} \right\rfloor \right\} + i;$$

where $N_{CCE,k}$ is the control channel resources on a subframe k, $M^{(L)}$ is the number of the PDCCH candidates to be detected in the search space, i=0, . . . , L−1, L is the aggregation level.

$Y_k=(A \cdot Y_{k-1})\mod D$, where $Y_{-1}=n_{RNTI}\neq 0$, A=39827, D=65537, $k=\lfloor n_s/2 \rfloor$, $n_s$ is a timeslot number in a radio frame. $n_{RNTI}$ is a corresponding radio network temporary identifier (RNTI).

It should be noted that, under the scene that the UE configures the carrier instructions domain, $m'=m+M^{(L)} \cdot n_{CI}$, where $n_{CI}$ is the value of the carrier instructions domain, and under the scene that the UE does not configure the carrier instructions domain, m'=m, where m=0, . . . , $M^{(L)}-1$.

Preferred Embodiment VI

Step S1402: UE detects the downlink control information on the discrete control channel resource units according to the predefined aggregation level, wherein the control channel resource units are dispersed in a manner of predefining an interval.

Preferably, the step S1402 comprises: when the UE detects the PDCCH according to a certain aggregation level, the number of the corresponding PDCCH candidates is M, then the position of the nth PDCCH candidate, with respect to the (n−1)th PDCCH candidate, is increased by offset resource units, wherein the offset can be configured as following manners:

Manner I: the offset is configured by the high-layer signalling, specifically:

When the aggregation level is 1, the position of the nth PDCCH candidate, with respect to the (n−1)th PDCCH candidate, is increased by A resource units; when the aggregation level is 2, the position of the nth PDCCH candidate, with respect to the (n−1)th PDCCH candidate, is increased by B resource units; when the aggregation level is 3, the position of the nth PDCCH candidate, with respect to the (n−1)th PDCCH candidate, is increased by C resource units; and when the aggregation level is 4, the position of the nth PDCCH candidate, with respect to the (n−1)th PDCCH candidate, is increased by D resource units.

A, B, C and D all can be notified by the high-layer signalling.

Manner II: the offset is a fixed value. For example, it is set to be 2 control channel resource units.

Manner III: the offset is computed by the aggregation level, the number of the control channel resource units of the user-specific search space, and the number of the PDCCH candidates, specifically:

when the UE detects the PDCCH according to a certain aggregation level, the number of the corresponding PDCCH candidates is M, then the position of the nth PDCCH candidate, with respect to the (n−1)th PDCCH candidate, is increased by N/M resource units, for example:

(1) when the UE detects the PDCCH according to the aggregation level of 1 or 2, the number of the corresponding PDCCH candidates is 6, then the position of the nth PDCCH candidate, with respect to the (n−1)th PDCCH candidate, is increased by N/6 resource units;

and (2) when the UE detects the PDCCH according to the aggregation level of 4 or 8, the number of the corresponding PDCCH candidates is 2, then the position of the nth PDCCH candidate, with respect to the (n−1)th PDCCH candidate, is increased by N/2 resource units.

In this manner, the UE-specific search space is defined as follows:

$$L \cdot \left\{ \left( Y_k + m' \cdot \left\lfloor \frac{N_k}{M^{(L)} \cdot L} \right\rfloor \right) \bmod \left\lfloor \frac{N_k}{L} \right\rfloor \right\} + i,$$

where $N_k$ k is the control channel resources on a subframe k, $M^{(L)}$ is the number of the PDCCH candidates to be detected in the search space, i=0, . . . , L−1, L is the aggregation level.

$Y_k = (A \cdot Y_{k-1}) \bmod D$, where $Y_{-1} = n_{RNTI} \neq 0$, A=39827, D=65537, k=$\lfloor n_s/2 \rfloor$, $n_s$ is a time slot number in a radio frame. $n_{RNTI}$ is a corresponding RNTI (radio network temporary identifier).

Preferably, under the scene that the UE configures the carrier instruction domain, $m'=+M^{(L)} \cdot n_{CI}$, where $n_{CI}$ is the value of the carrier instruction domain, and under the scene that the UE does not configure the carrier instructions domain, m'=m, wherein m=0, . . . , $M^{(L)}$−1.

Manner IV: the offset is notified by the signalling in the information of the legacy downlink control channel, the legacy downlink control channel being the downlink control channel of a control channel area on the same subframe or other subframes.

Through the above-mentioned embodiments, the method and the device for sending the downlink control information, and the method and the device for receiving the downlink control information are provided, not all of the above-mentioned implementations have these technical effects, some technical effects can only be achieved by some preferred implementations.

Obviously, those skilled in the art shall understand that the above-mentioned modules and steps of the disclosure can be realized by using general purpose calculating device, can be integrated in one calculating device or distributed on a network which consists of a plurality of calculating devices.

Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the disclosure are all included in the scope of the protection of the disclosure.

What is claimed is:

1. A method for sending downlink control information, which is applied to an eNodeB, comprising:
   determining discrete user-specific search space, wherein control channel resources corresponding to the discrete user-specific search space are distributed discretely; and
   sending the downlink control information on the discrete user-specific search space;
   wherein the discrete user-specific search space is contained in one Component Carrier and comprises discrete physical downlink control channel candidates, and the discrete physical downlink control channel candidates is determined by a predefined interval;
   wherein the predefined interval is determined by:
   an aggregation level, a number of control channel resource units of the user-specific search space and a number of physical downlink control channel candidates.

2. The method according to claim 1, wherein the control channel resource comprises one of the following: a virtual resource block, a physical resource block and a control channel element.

3. The method according to claim 1, wherein the method further comprises:
   the eNodeB sends to user equipment (UE) a configuration, which is for the UE to detect a downlink control channel, of the control channel resources where the discrete user-specific search space is located, wherein the configuration of the control channel resources comprises that configurations at position of the frequency domain, which are corresponding to position of each time domain unit, of the downlink control channel are the same, or the position of the frequency domain of the downlink control channel changes with the position of the time domain unit.

4. The method according to claim 3, wherein the time domain unit comprises one of the following: a subframe, a time slot, a plurality of subframes, a plurality of time slots.

5. The method according to claim 3, wherein the position of the frequency domain is determined by at least one of the following:
   downlink bandwidth;
   a notification of the high layer signalling;
   a high layer signalling and the predefined interval; and
   a signalling notification in the downlink control information of the legacy downlink control channel.

6. The method according to claim 5, wherein determining the position of the frequency domain by the signalling notification in the downlink control information of the legacy downlink control channel comprises:

the position of the frequency domain is determined by taking a resource block group as the unit.

7. A method for receiving downlink control information, which is applied to an user equipment (UE), comprising:
determining discrete user-specific search space, wherein control channel resources corresponding to the discrete user-specific search space are distributed discretely, wherein the discrete user-specific search space is contained in one Component Carrier and comprises discrete physical downlink control channel candidates, and the discrete physical downlink control channel candidates is determined by a predefined interval;
wherein the predefined interval is determined by:
an aggregation level, a number of control channel resource units of the user-specific search space and a number of physical downlink control channel candidates; and
detecting the downlink control information on the discrete user-specific search space.

8. The method according to claim 7, wherein the method further comprises:
receiving a configuration, which is sent by the eNodeB and is for detecting a downlink control channel, of the control channel resources where the discrete user-specific search space is located, wherein the configuration of the control channel resources comprises that configurations at position of the frequency domain, which are corresponding to position of each time domain unit, of the downlink control channel are the same, or the position of frequency domain of the downlink control channel changes with the position of the time domain unit.

9. A device for sending downlink control information, which is applied to an eNodeB, wherein the device comprises:
a first determination module configured to determine discrete user-specific search space, wherein control channel resources corresponding to the discrete user-specific search space are distributed discretely,
wherein the discrete user-specific search space is contained in one Component Carrier and comprises discrete physical downlink control channel candidates, and the discrete physical downlink control channel candidates is determined by a predefined interval;
wherein the predefined interval is determined by:
an aggregation level, a number of control channel resource units of the user-specific search space and a number of physical downlink control channel candidates; and
a first sending module, which is connected to the first determination module, and configured to send the downlink control information on the discrete user specific search space.

10. The device according to claim 9, further comprising:
a sending module, which is connected to the first determination module and configured to send to the user equipment (UE) a configuration, which is for the UE to detect a downlink control channel, of the control channel resources where the discrete user-specific search space is located, wherein the configuration of the control channel resources comprises that configurations at position of the frequency domain, which are corresponding to position of each time domain unit, of the downlink control channel are the same, or the position of the frequency domain of the downlink control channel changes with the position of the time domain unit.

11. A device for receiving downlink control information, which is applied to user equipment (UE), comprising:
a third determination module configured to determine discrete user-specific search space, wherein control channel resources corresponding to the discrete user-specific search space are distributed discretely;
wherein the discrete user-specific search space is contained in one Component Carrier and comprises discrete physical downlink control channel candidates, and the discrete physical downlink control channel candidates is determined by a predefined interval;
wherein the predefined interval is determined by:
an aggregation level, a number of control channel resource units of the user-specific search space and a number of physical downlink control channel candidates; and
a detection module, which is connected to the third determination module and configured to detect the downlink control information on the discrete user-specific search space.

12. The device according to claim 11, wherein the device further comprises:
a receiving module, which is connected to the third determination module and configured to receive a configuration, which is sent by the eNodeB and is for detecting a downlink control channel, of the control channel resources where the discrete user-specific search space is located, wherein the configuration of the control channel resources comprises that configurations at position of the frequency domain, which are corresponding to position of each time domain unit, of the downlink control channel are the same, or the position of frequency domain of the downlink control channel changes with the position of the time domain unit.

13. The method according to claim 1, wherein the control channel resource comprises one of the following: a virtual resource block, a physical resource block and a control channel element.

14. The method according to claim 1, wherein the control channel resource comprises one of the following: a virtual resource block, a physical resource block and a control channel element.

15. The method according to claim 1, wherein the definition of the UE-specific search space can be represented by the following formula:

$$L \cdot \left\{ \left( Y_k + m' \cdot \left\lfloor \frac{N_k}{M^{(L)} \cdot L} \right\rfloor \right) \bmod \left\lfloor \frac{N_k}{L} \right\rfloor \right\} + i;$$

where $N_{CCE,k}$ is the control channel resources on a subframe k, $M^{(L)}$ is the number of the PDCCH candidates to be detected in the search space, i=0, ..., L−1, L is the aggregation level; $Y_k=(A \cdot Y_{k-1}) \bmod D$, where $Y_{-1}=n_{RNTI} \neq 0$, A=39827, D=65537, $k=\lfloor n_s/2 \rfloor$, $n_s$ is a timeslot number in a radio frame; $n_{RNTI}$ is a corresponding radio network temporary identifier (RNTI); wherein under the scene that the UE does not configure the carrier instructions domain, m'=m.

16. The method according to claim 7, wherein the definition of the UE-specific search space can be represented by the following formula:

$$L \cdot \left\{ \left( Y_k + m' \cdot \left\lfloor \frac{N_k}{M^{(L)} \cdot L} \right\rfloor \right) \bmod \left\lfloor \frac{N_k}{L} \right\rfloor \right\} + i;$$

where $N_{CCE,k}$ is the control channel resources on a subframe k, $M^{(L)}$ is the number of the PDCCH candidates to be detected in the search space, i=0, ..., L−1, L is the aggregation level; $Y_k=(A \cdot Y_{k-1}) \bmod D$, where $Y_{-1}=n_{RNTI} \neq 0$, A=39827, D=65537, k=$\lfloor n_s/2 \rfloor$, $n_s$ is a timeslot number in a radio frame; $n_{RNTI}$ is a corresponding radio network temporary identifier (RNTI); wherein under the scene that the UE does not configure the carrier instructions domain, m'=m.

17. The device according to claim 9, wherein the definition of the UE-specific search space can be represented by the following formula:

$$L \cdot \left\{ \left( Y_k + m' \cdot \left\lfloor \frac{N_k}{M^{(L)} \cdot L} \right\rfloor \right) \bmod \left\lfloor \frac{N_k}{L} \right\rfloor \right\} + i;$$

where $N_{CCE,k}$ is the control channel resources on a subframe k, $M^{(L)}$ is the number of the PDCCH candidates to be detected in the search space, i=0, ..., L−1, L is the aggregation level; $Y_k=(A \cdot Y_{k-1}) \bmod D$, where $Y_{-1}=n_{RNTI} \neq 0$, A=39827, D=65537, k=$\lfloor n_s/2 \rfloor$, $n_s$ is a timeslot number in a radio frame; $n_{RNTI}$ is a corresponding radio network temporary identifier (RNTI); wherein under the scene that the UE does not configure the carrier instructions domain, m'=m.

18. The device according to claim 11, wherein the definition of the UE-specific search space can be represented by the following formula:

$$L \cdot \left\{ \left( Y_k + m' \cdot \left\lfloor \frac{N_k}{M^{(L)} \cdot L} \right\rfloor \right) \bmod \left\lfloor \frac{N_k}{L} \right\rfloor \right\} + i;$$

where $N_{CCE,k}$ is the control channel resources on a subframe k, $M^{(L)}$ is the number of the PDCCH candidates to be detected in the search space, i=0, ..., L−1, L is the aggregation level; $Y_k=(A \cdot Y_{k-1}) \bmod D$, where $Y_{-1}=n_{RNTI} \neq 0$, A=39827, D=65537, k=$\lfloor n_s/2 \rfloor$, $n_s$ is a timeslot number in a radio frame; $n_{RNTI}$ is a corresponding radio network temporary identifier (RNTI); wherein under the scene that the UE does not configure the carrier instructions domain, m'=m.

* * * * *